(12) United States Patent  (10) Patent No.: US 9,108,535 B2
Teufel et al.  (45) Date of Patent: Aug. 18, 2015

(54) LONGITUDINALLY ADJUSTABLE VEHICLE SEAT

(75) Inventors: Ingo Teufel, Rockenhausen (DE); Kai Schumann, Rieschweiler (DE)

(73) Assignee: KEIPER GMBH & CO. KG, Kaiserlautern (DE)

( * ) Notice: Subject to any disclaimer, the term of this patent is extended or adjusted under 35 U.S.C. 154(b) by 0 days.

(21) Appl. No.: 13/992,647

(22) PCT Filed: Nov. 25, 2011

(86) PCT No.: PCT/EP2011/005931
§ 371 (c)(1),
(2), (4) Date: Aug. 1, 2013

(87) PCT Pub. No.: WO2012/084116
PCT Pub. Date: Jun. 28, 2012

(65) Prior Publication Data
US 2013/0302626 A1  Nov. 14, 2013

(30) Foreign Application Priority Data

Dec. 20, 2010 (DE) .......................... 10 2010 055 244

(51) Int. Cl.
*F16M 13/00* (2006.01)
*B60N 2/08* (2006.01)
(Continued)

(52) U.S. Cl.
CPC ............ *B60N 2/0831* (2013.01); *B60N 2/0727* (2013.01); *B60N 2/0818* (2013.01); *B60N 2/0875* (2013.01); *B60N 2/12* (2013.01)

(58) Field of Classification Search
CPC ...... B60N 2/123; B60N 2/0818; B60N 2/085; B60N 2/0725; B60N 2/0806; B60N 2/0887; B60N 2/20

USPC ............... 248/419, 429, 430; 297/341, 344.1; 296/65.13
See application file for complete search history.

(56) References Cited

U.S. PATENT DOCUMENTS 4,856,847 A * 8/1989 Kanai ............................ 297/341
5,855,349 A * 1/1999 Nini et al. ..................... 248/429
(Continued)

FOREIGN PATENT DOCUMENTS

CN  1715098 A  1/2006
DE  43 04 456 A1  8/1993
(Continued)

OTHER PUBLICATIONS

International Search Report (English translation) received in connection with international application No. PCT/EP2011/005931; dtd Apr. 23, 2012.
(Continued)

*Primary Examiner* — Bradley Duckworth
(74) *Attorney, Agent, or Firm* — Foley & Lardner LLP

(57) ABSTRACT

A longitudinally adjustable vehicle seat includes a first rail fixed to the structure, a second rail guided in the first rail and connected to the vehicle seat, a releasable locking device for locking the position of the first rail relative to the second rail, first, second, and third end stops, which limit the movability of the rail pair, wherein one of the end stops can be disabled by a stop surface that can be moved out of the path of travel of the rails. The movable stop surface is arranged on the second rail, and the end stop that can be disabled, on which the movable stop surface is formed, can be actuated together with the locking device in order for an easy-entry position to be assumed.

15 Claims, 10 Drawing Sheets

Figure 4D:
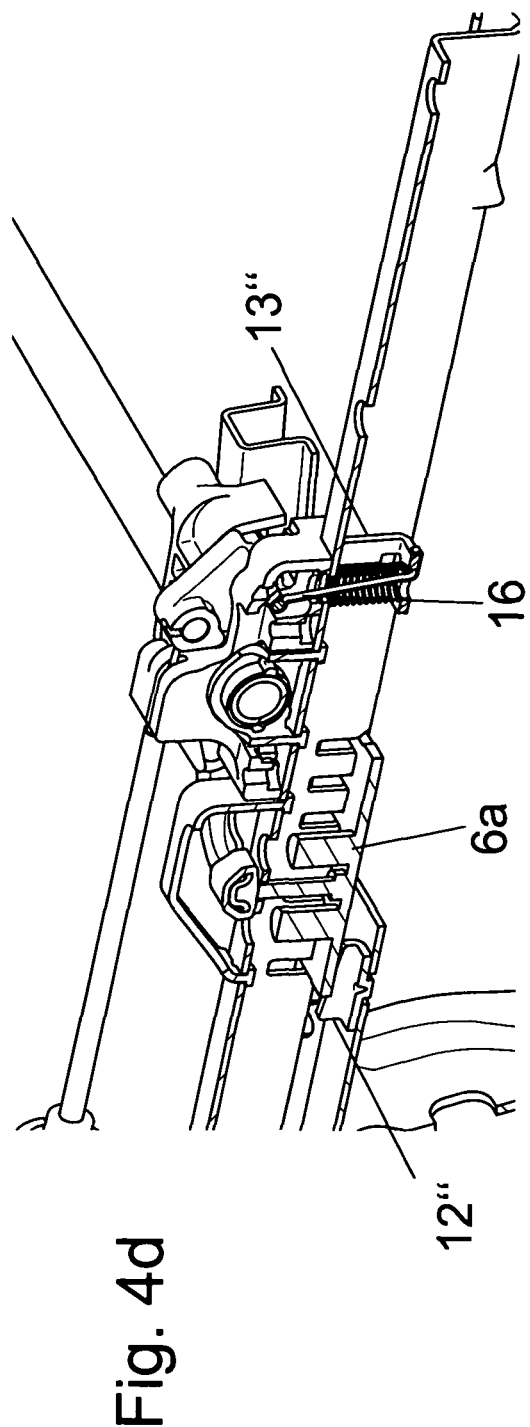

(51) Int. Cl.
*B60N 2/07* (2006.01)
*B60N 2/12* (2006.01)

(56) References Cited

U.S. PATENT DOCUMENTS

| | | | |
|---|---|---|---|
| 5,918,846 A * | 7/1999 | Garrido | 248/429 |
| 6,234,575 B1 * | 5/2001 | Schuler et al. | 297/344.1 |
| 7,195,303 B2 * | 3/2007 | Nihonmatsu et al. | 296/65.13 |
| 7,318,573 B2 * | 1/2008 | Yamada et al. | 248/424 |
| 7,600,816 B2 * | 10/2009 | Bauersachs et al. | 297/341 |
| 8,191,850 B2 | 6/2012 | Wetzig et al. | |
| 8,474,777 B2 * | 7/2013 | Nihonmatsu et al. | 248/429 |
| 8,490,941 B2 * | 7/2013 | Mizuno et al. | 248/429 |
| 8,517,328 B2 * | 8/2013 | Wieclawski et al. | 248/429 |
| 2006/0138836 A1 | 6/2006 | Yudovich | |
| 2008/0282834 A1 | 11/2008 | Schmale | |
| 2010/0176265 A1 * | 7/2010 | Kojima et al. | 248/429 |

FOREIGN PATENT DOCUMENTS

| | | |
|---|---|---|
| DE | 10 2004 015 450 A1 | 11/2005 |
| DE | 2020090 02 972 U1 | 8/2009 |
| DE | 10 2008 056 969 B3 | 10/2009 |
| DE | 10 2008 056 683 A1 | 5/2010 |
| EP | 1 389 557 A1 | 2/2004 |
| EP | 1 612 089 A2 | 1/2006 |
| JP | 2006-188210 | 7/2006 |
| JP | 2008-515704 A | 5/2008 |
| JP | 2009-029272 | 2/2009 |

OTHER PUBLICATIONS

Office Action dated May 13, 2014 in Japanese Application No. 2013-534209 along with the English translation, 15 pps.

Office Action in corresponding Chinese application No. 201180047202.6 dated Dec. 3, 2014, 6 pages.

* cited by examiner

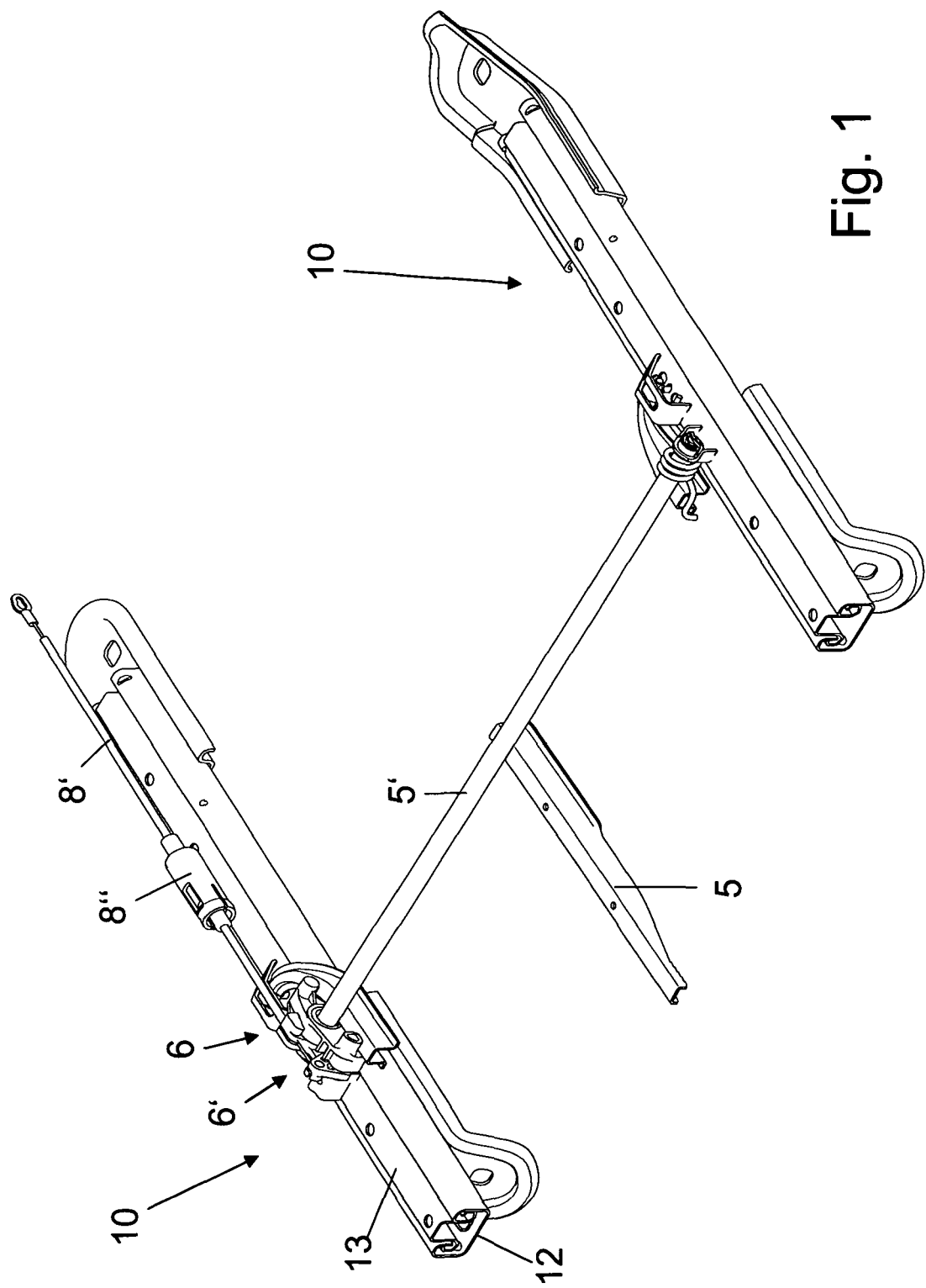

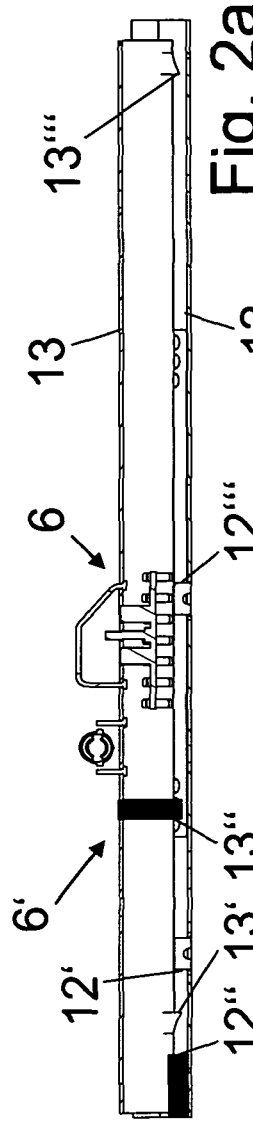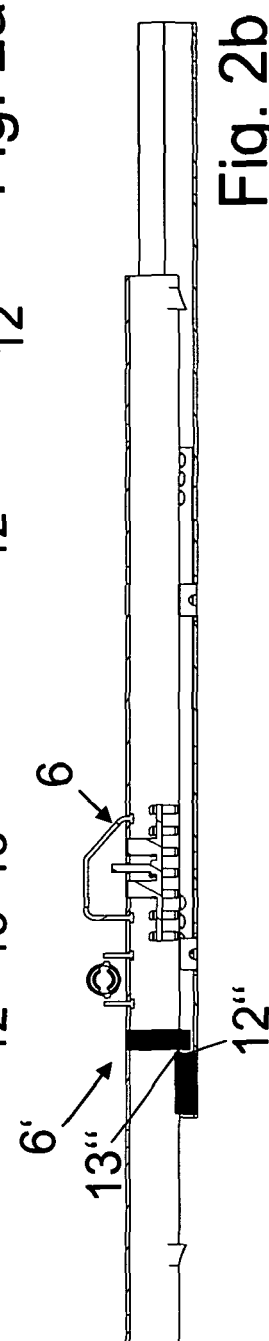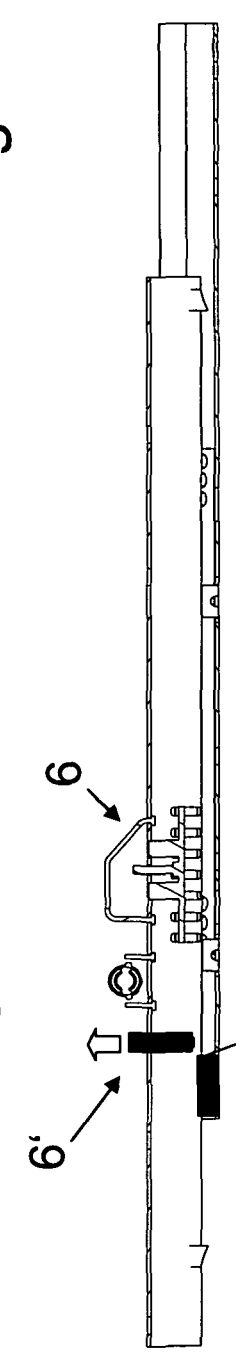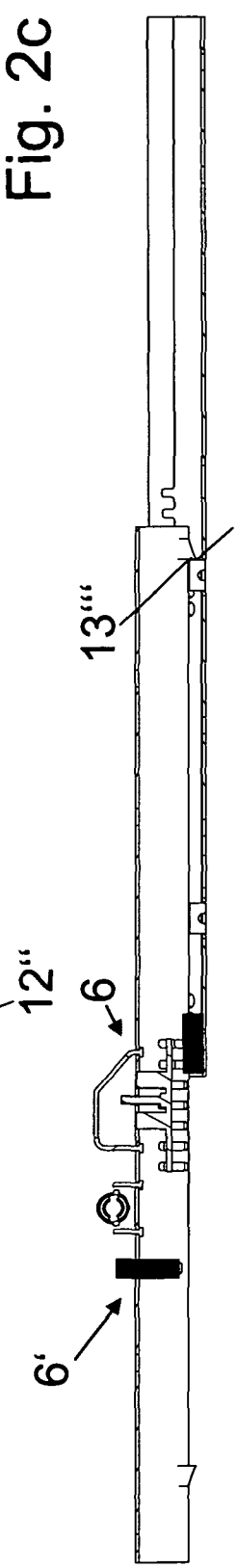

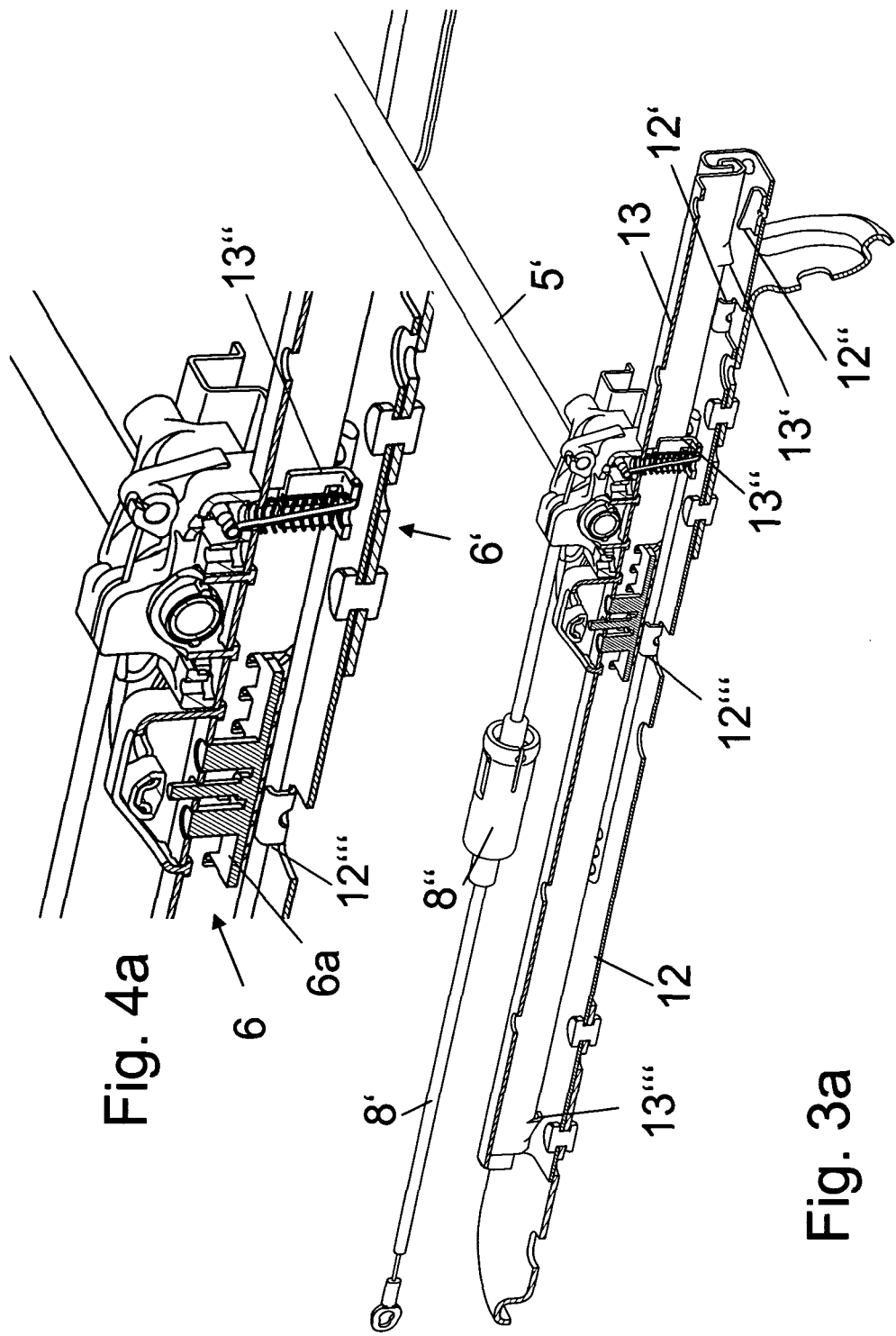

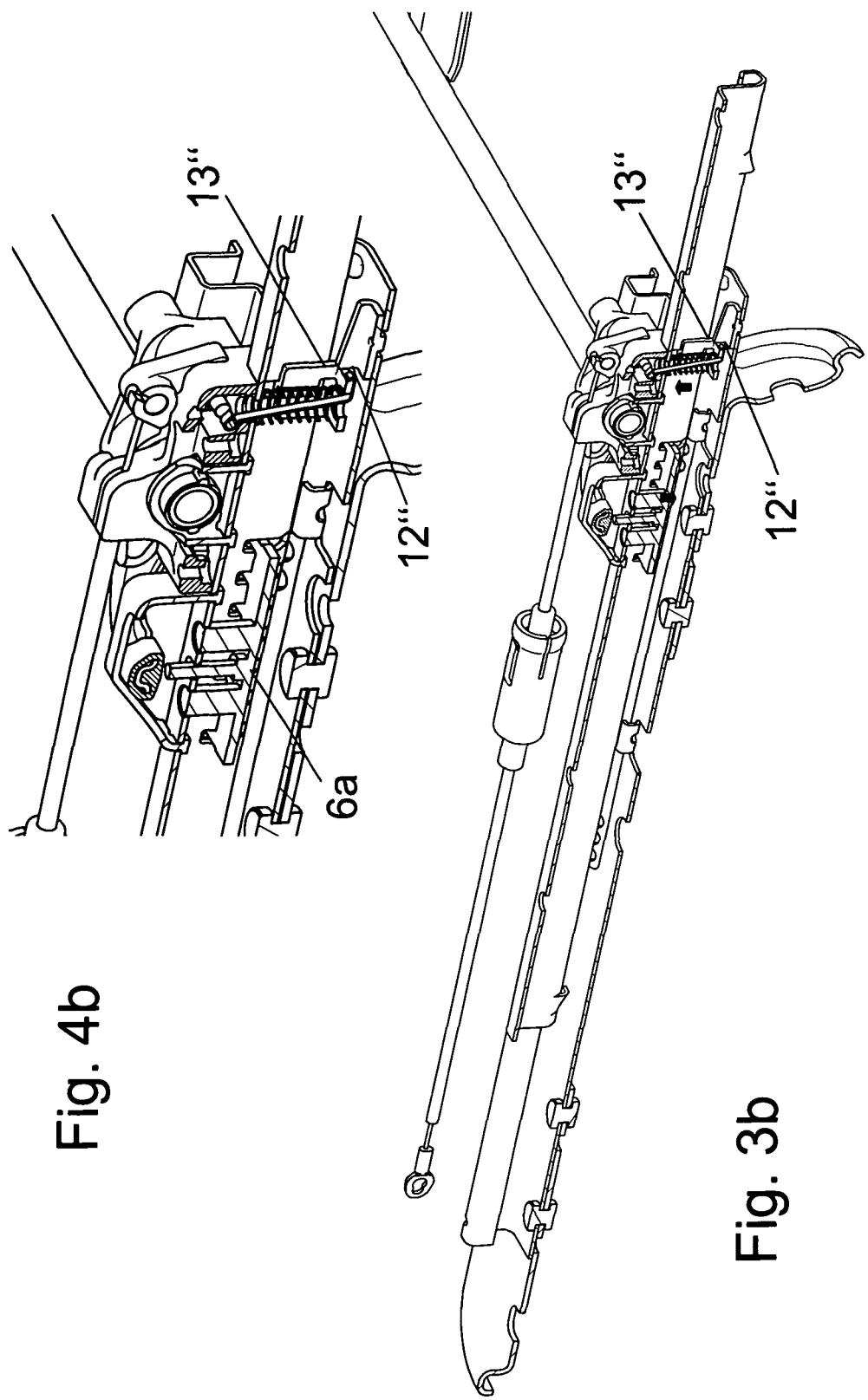

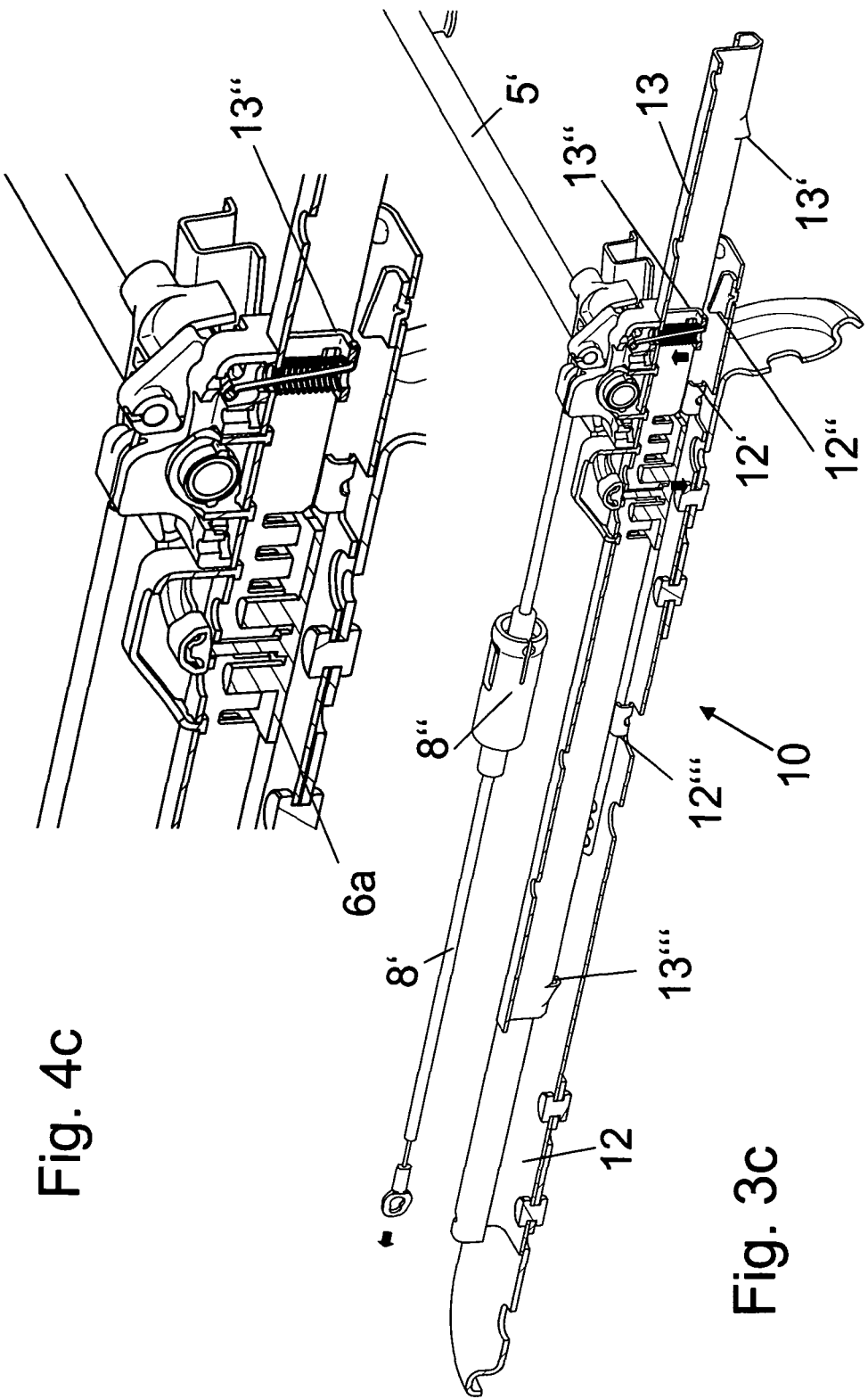

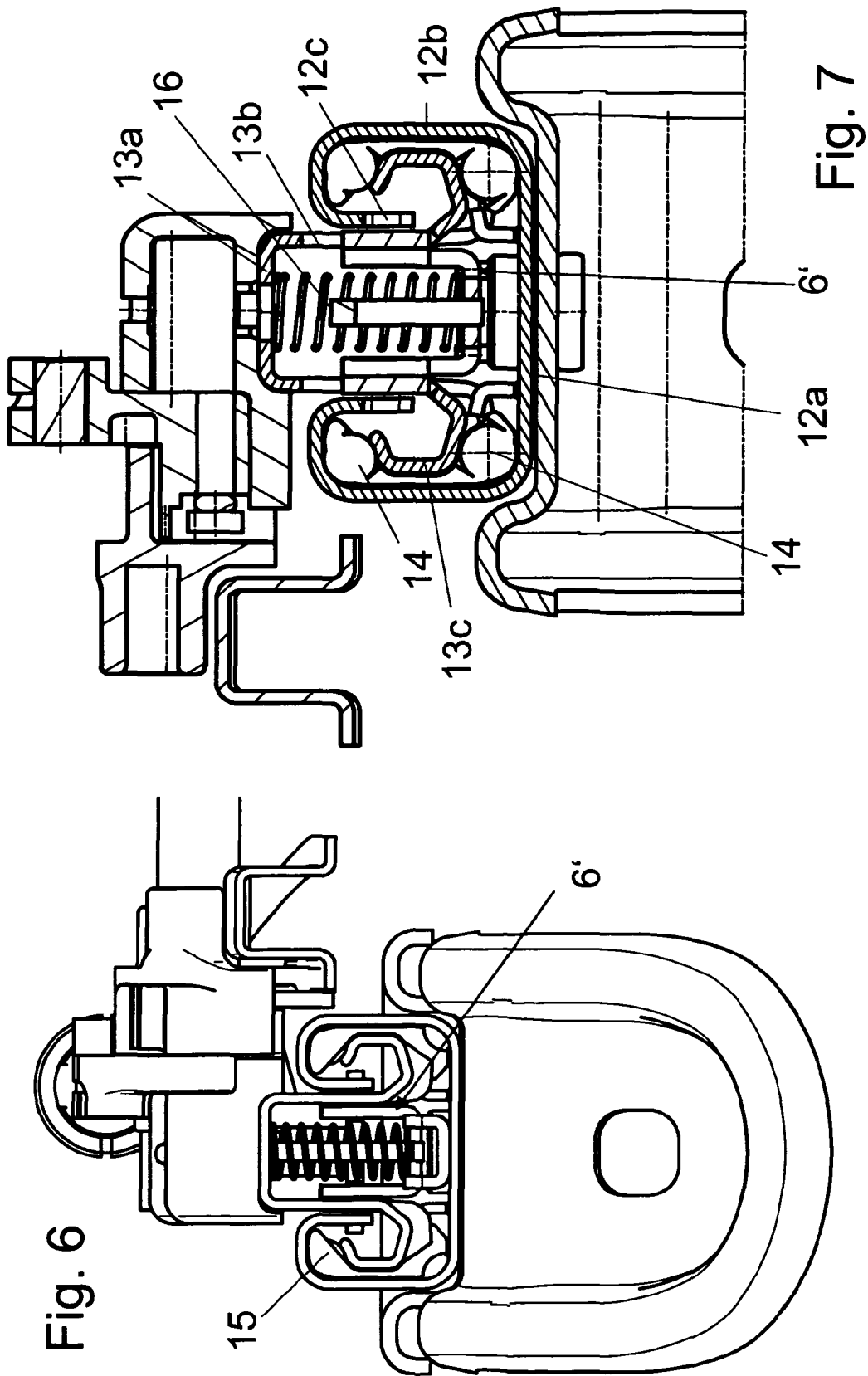

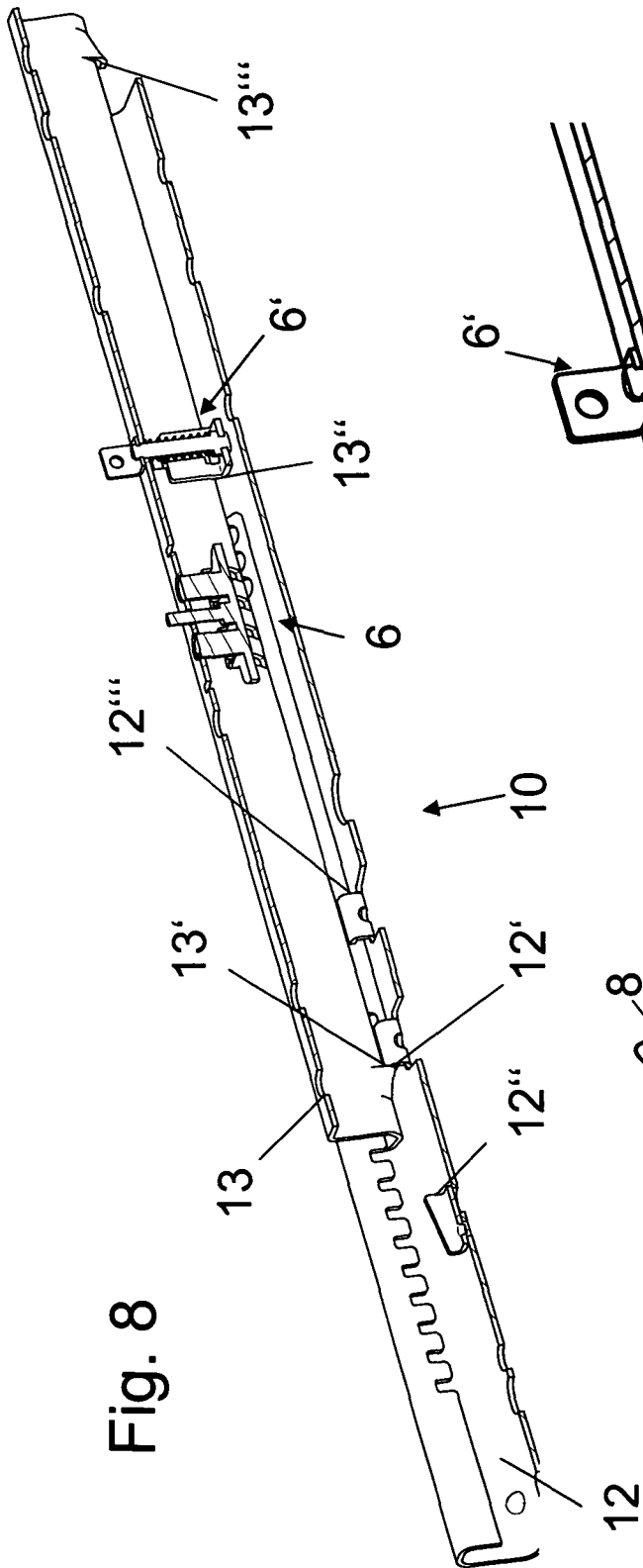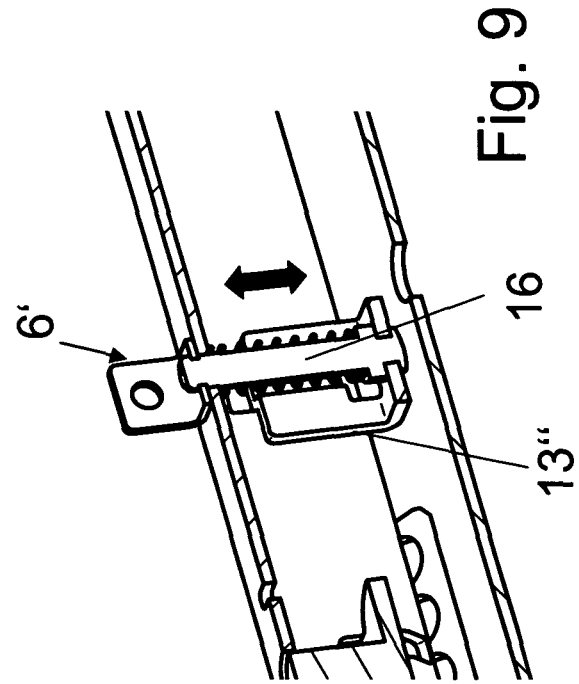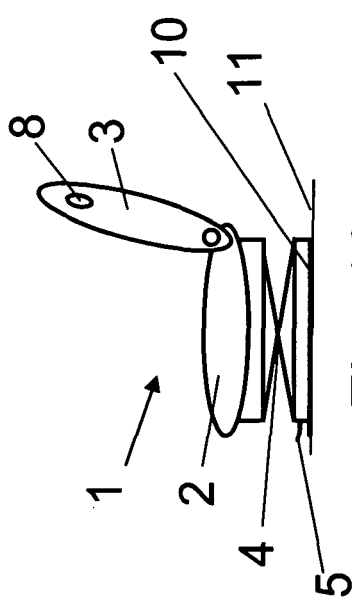

LONGITUDINALLY ADJUSTABLE VEHICLE SEAT

CROSS REFERENCE TO RELATED APPLICATIONS

The present application is a National Stage of International Application No. PCT/EP2011/005931 filed on Nov. 25, 2011, which claims the benefit of German Patent Application No. 10 2010 055 244.5 filed on Dec. 20, 2010, the entire disclosures of which are incorporated herein by reference.

The invention relates to a longitudinally adjustable vehicle seat with the features of the preamble of claim 1.

A vehicle seat longitudinal adjuster is known from DE 10 2008 056 969 B3. In this case, in a pair of rails for a longitudinally adjustable vehicle seat with a first rail fixed to the structure, a second rail connected to the vehicle seat and led in said first rail, a first end stop, a second end stop, and a detachable locking device for detachably locking the position of the first rail with respect to the second rail, a first stop surface interacting with the first end stop and a second stop surface interacting with the second end stop define a traveling path of the second rail relative to the first rail. Furthermore, a third end stop is provided, which can be actuated by means of an actuation device and together with the first stop surface defines a third final position, and this third final position of the second rail is arranged in relation to the first rail between said first final position and said second final position. This third, disconnectable end stop is, preferably, the rear end stop for the normal use, so that the traveling path can, if necessary, be increased backwards.

For example, a fixed arrangement of an end stop of a rail connected to the vehicle seat and slidable lengthwise, which end stop interacts with a counterstop in order to define a final position of the rail, is known from DE 43 04 456 A1.

The object of the invention is to improve a longitudinally adjustable vehicle seat of the above-described type. In particular, the comfort for the user of the vehicle seat is intended to be increased and entry to and exit from the back rows of vehicle seats is intended to be facilitated. According to the invention, this object is achieved by a vehicle seat with the features of claim 1. Advantageous embodiments are the subject matter of the subclaims.

According to the invention, in a longitudinally adjustable vehicle seat of the type in question, the stop surface, which can move out of the traveling path of the rails, is arranged on the seat-mounted second rail, wherein the disconnectable end stop, on which the movable stop surface is formed, can be actuated together with the locking device for adopting an easy-entry position.

By providing the disconnectable stop surface on the seat-mounted rail, a direct control via the easy-entry function is possible, particularly preferably by means of a Bowden cable which is connected to part of the backrest and can be actuated by the pivoting-forward movement of the backrest. In addition, by positioning the disconnectable stop surface on the seat-mounted rail, fewer component parts are necessary and can be arranged protected inside the rail installation space.

It is preferred that the maximum adjustment range forwards and backwards is limited in each case by a fixed end stop, wherein the comfort adjustment range is a sub-range of the maximum adjustment range.

Preferably, the disconnectable end stop has said movable stop surface, which is arranged on the seat-mounted second rail, and the two other end stops have fixed stop surfaces on the seat-mounted second rail, wherein the movable stop surface of the disconnectable end stop is arranged between the two fixed stop surfaces of the two other end stops. It is preferable here that the associated stop surfaces of the end stops are arranged on the first rail, fixed to the structure, in such a way that the stop surface of the disconnectable end stop, which stop surface is associated with the movable stop surface, is arranged at one end of the first rail fixed to the structure.

It is particularly preferable that the disconnectable end stop is guided in at least one slot formed in the first rail. In principle, when a twisting of the disconnectable end stop can be securely prevented, a channel in one of the two sides of the rail is sufficient, but it is preferred to provide a mirror-inverted design with respect to the median longitudinal plane of the rail.

Such a vehicle seat can be used, for example, in a passenger car or a commercial vehicle, wherein it does not necessarily have to be the driver's seat. Such a vehicle seat is preferably provided in a front seat row, but it can also be provided in a middle or back seat row, for example, also in a van.

Hereinbelow, the invention is discussed in more detail on the basis of embodiment examples and partially by referring to the drawing, in which:

FIG. 1 shows a perspective view of two rail pairs for a longitudinally adjustable vehicle seat according to the first embodiment example, FIGS. 2a-d show a longitudinal centric cross section of a rail pair from FIG. 1 in different positions.

Figure 5:
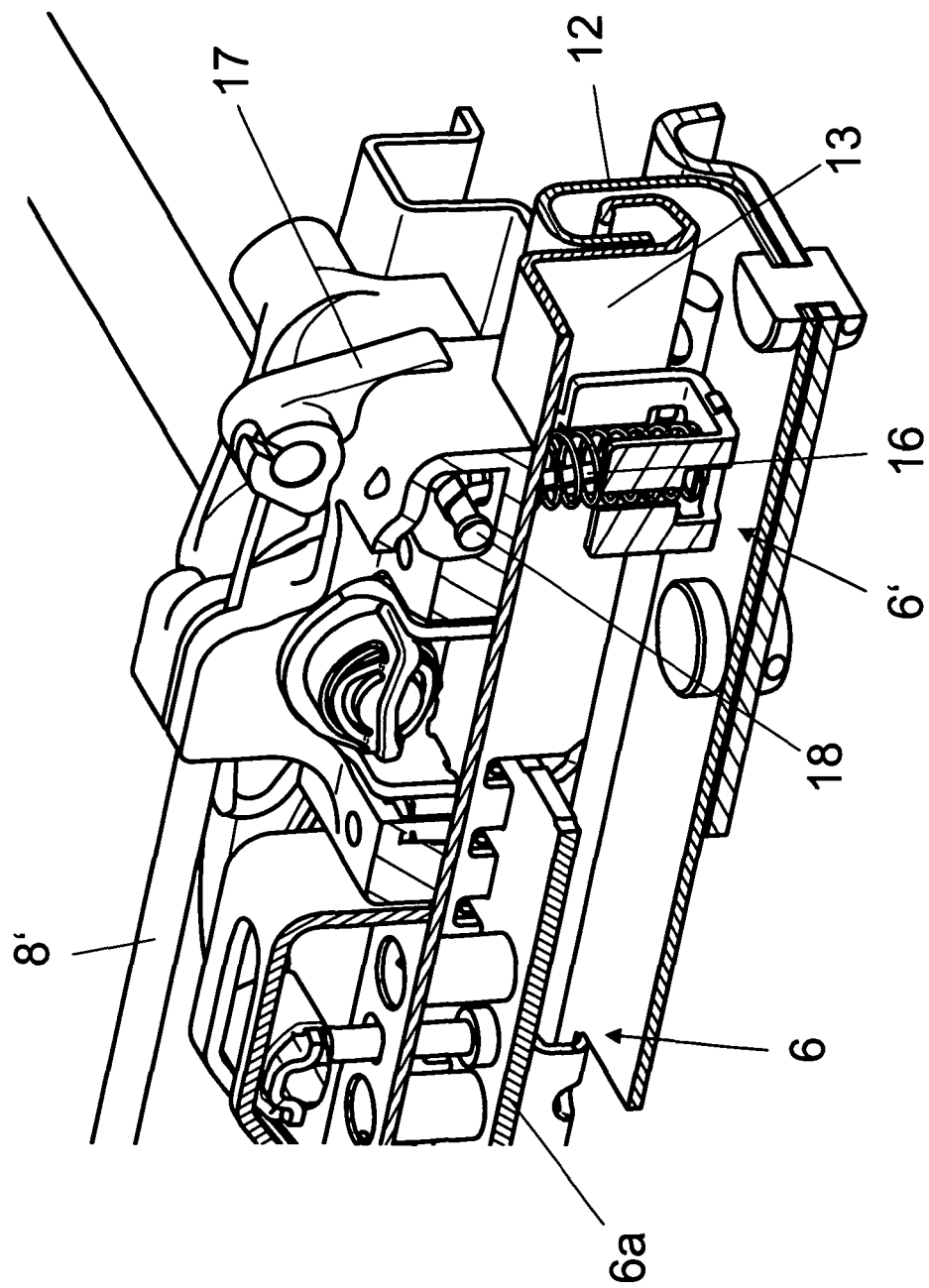
Figure 11:
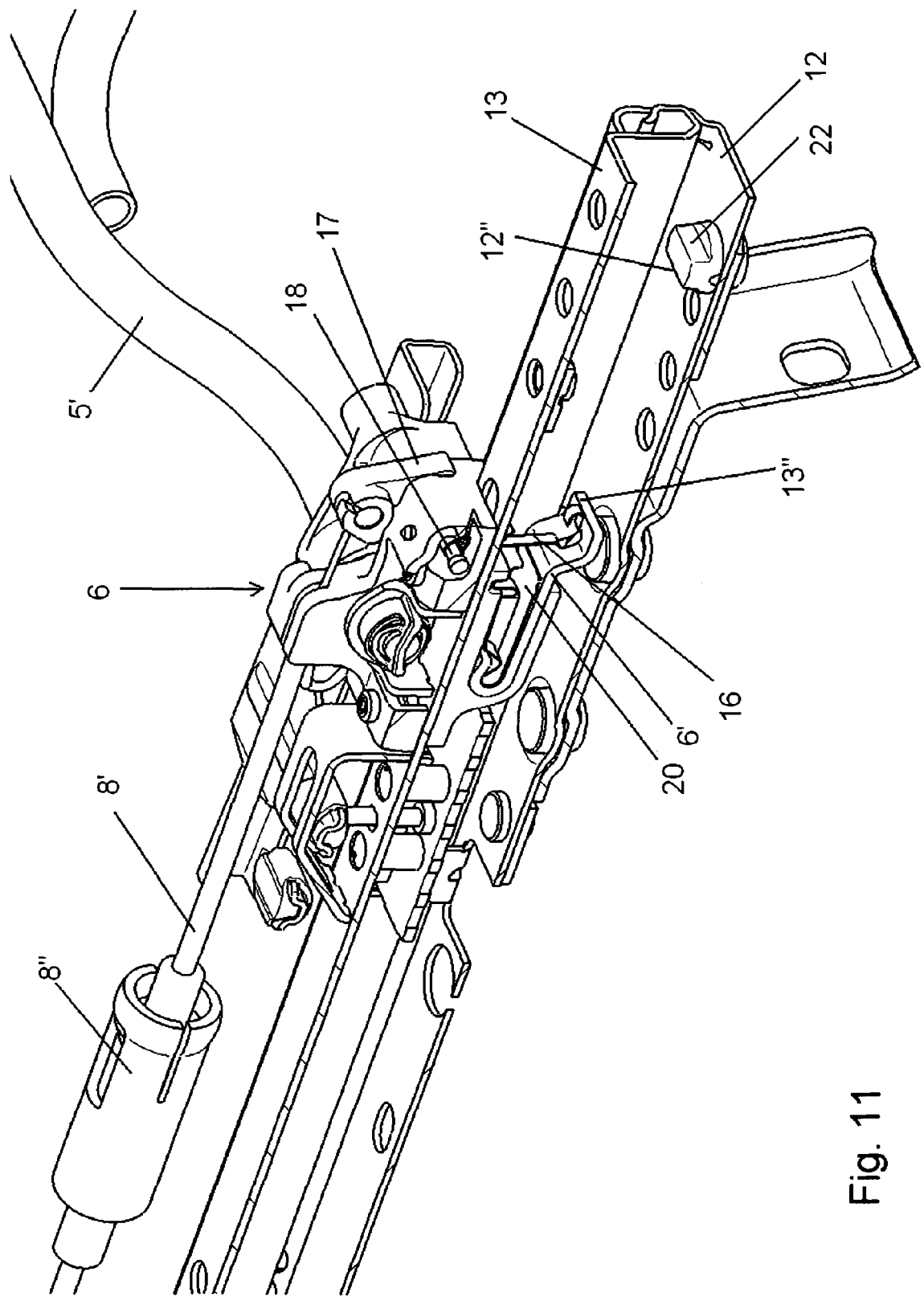

FIGS. 3a-d show cutaway, slightly perspective views of the rail pairs from FIGS. 2a-d, seen in the corresponding positions and from the other side, FIGS. 4a-d show detailed views of the rail pairs from FIGS. 3a-d in the corresponding positions, FIG. 5 shows a perspective detailed presentation corresponding to FIG. 4a with another section direction, FIG. 6 shows a front view, FIG. 7 shows a cutaway view from behind, FIG. 8 shows a perspective, cutaway view of one rail pair according to a second embodiment example, FIG. 9 shows a detailed view of FIG. 8, FIG. 10 shows a schematic lateral view of a vehicle seat with two rail pairs, and FIG. 11 shows a perspective, cutaway view of one rail pair according to a third embodiment example.

A longitudinally adjustable vehicle seat 1, available for a three-door motor vehicle, has a seating surface 2, a backrest 3, which is connected to the seating surface by means of a fitting so as to be inclination-adjustable in the known way, and a scissor frame 4 mounted under the seating surface 2 for adjusting the inclination and height position of the seating surface 2, wherein the inclination and height adjustability of the seating surface 2 may alternatively also be omitted.

The arrangement of the vehicle seat inside the vehicle and the usual travel direction thereof define the directional data used below. In this case, a direction, which is oriented perpendicular to the ground, is designated below as a vertical direction, and a direction, which is perpendicular to the vertical direction and perpendicular to the travel direction, is designated below as a transverse direction.

The vehicle seat 1 is connected to the vehicle structure 11 by means of two rail pairs 10, wherein the two seat rail pairs 10 are designed in conformity with each other, and therefore only one rail pair 10 is described in detail below. The vehicle seat 1 has a longitudinal adjuster with a lever 5 as operating control for the longitudinal adjuster, wherein a locking device 6, which locks the rail pair 10, can be unlocked with the lever 5, so that the vehicle seat 1 can be longitudinally adjusted within a comfort adjustment range. Said lever 5 is provided under the vehicle seat 1 for operating the locking device 6. The torque applied through the lever 5 is transmitted simultaneously via a cross bar 5' to the locking devices 6 provided on the two rail pairs 10.

Furthermore, the vehicle seat 1 has an easy-entry function. In order to facilitate entry, the backrest 3 can be unlocked and pivoted forwards by actuating a handle 8 mounted on the backrest side, wherein also the locking device 6, which is available slightly shifted in time with respect to the pivoting forward of the backrest 3, is unlocked, so that the vehicle seat 1 can be shifted forwards, in the present case beyond comfort adjustment range. In the process, a Bowden cable, not shown in detail, which is released by actuation of the handle 8 and the associated pivoting forward of the backrest 3, is actuated, unlocking the fittings of the vehicle seat 1.

The pivoting movement of the backrest 3 actuates a Bowden cable 8', which is provided on a seat side, in the present case on the right-hand seat side in the travel direction. The Bowden cable 8', which has an excess travel protection device 8" formed in a known manner, is connected to the locking device 6 on the right-hand side of the seat, which is released with the pivoting forward of the backrest 3. In the process, the cross bar 5' is rotated by the lever 5, by which the locking device on the left side of the seat is also released.

A mirror-inverted configuration is also possible, wherein on the right-hand side as well as on the left side of the seat a Bowden cable 8' is provided, in each case connected to a locking device 6. Then the two Bowden cables 8', which are provided on both sides of the seat, are actuated by the pivoting movement of the backrest 3, by which the two locking devices 6 are released.

Furthermore, with the aid of the Bowden cable 8', actuation is performed of a disconnectable end stop 6', which will be subsequently discussed in more detail, and whose actuation makes possible the forward movement of the vehicle seat 1 beyond the comfort adjustment range.

The seat rail pair 10 has a first rail 12, which, in the present case with the interposition of two adapters, is firmly connected to the vehicle structure 11 and is arranged at the bottom, and a second rail 13, which is connected to the seat understructure, i.e., in the present case, to the scissor frame 4. In this case, the first rail 12 is formed with a base 12a, attached to the vehicle structure 11, with openings for connection, and two sides 12b bent upwards, and has edge regions 12c bent inwards at 180°. The second rail 13 is arranged within the first rail 12, wherein it has one even area 13a arranged on the top for connection to the scissor frame 4, two downwards bent sides 13b and outwards bent edge regions 13c, which are arranged between the sides 12b and the edge regions 12c of the first rail 12, so that the first rail 12 encompasses the second rail 13. In order to maintain a low level of the friction between the two rails 12 and 13, several balls 14 are arranged above and under the two sides of the outwards bent edge regions, i.e. in the side region of the rail interstice, with the aid of ball holders 15.

For the normal use of the vehicle seat 1, the second rail 13 can be moved between final positions, determined by end stops, within a comfort adjustment range, and can be locked detachably to different seat longitudinal positions of the vehicle seat 1 with the aid of said locking device 6, as it is shown in principle in DE 10 2008 056 683 A1, or alternatively, for example, with a locking device as shown in EP 1 389 557 B1.

In a backwards direction, in relation to the normal mounting direction of the vehicle seat 1 and the travel direction of the vehicle, the rear end stop is formed by means of a stop surface 12' at a first edge on the base 12a of the first rail 12 fixed to the vehicle structure and a stop surface 13' at a first edge on the seat-mounted second rail 13. The first edge of the seat-mounted second rail 13 is hereby arranged in the front area of the second rail 13, as is the first edge of the first rail 12 fixed to the vehicle structure.

The front end stop for delimiting the comfort adjustment range forwards is formed by means of a stop surface 12" at the second edge on the base 12a of the first rail 12 fixed to the vehicle structure and a stop surface 13" at said disconnectable end stop 6', which can move in a direction that is perpendicular to the even area 13a of the second rail 13, and, in the present case, is liftable upwards.

The front end stop for delimiting the maximum traveling range forwards, which is available for limiting the maximum shift of the vehicle seat 1 for adopting the easy-entry position, is formed in the present case by means of a stop surface 12''' at a third edge on the base 12a of the first rail 12 fixed to the vehicle structure and a stop surface 13''' at a third edge of the seat-mounted second rail 13. In this case, the third edge at the base 12a of the first rail 12 fixed to the vehicle structure is arranged approximately in the middle of the rail, and the third edge of the seat-mounted second rail 13 is arranged at the rear end of the second rail 13.

The stop surfaces 12' and 12''' are formed in the present case by means of brackets placed upright, i.e. connected as one piece to the first rail 12. On the other hand, the stop surface 12" is formed by means of a separately formed part which is fixed to the first rail 12. By subsequent mounting, the comfort adjustment range can be adapted to different vehicle types without the need for different rail types for the same maximum adjustment range. Certainly, for example, also all of the stop surfaces 12', 12", 12''' can be formed from separately formed parts or can be formed as one piece with the first rail 12.

The disconnectable end stop 6' is essentially arranged within the hollow space formed by the two rails 12, 13, wherein it has a power transmission element which is movable perpendicular to the even area 13a of the second rail 13 and is formed in the present case by means of a tension element 16, pre-stressed downwards by a spring coiled in a cylinder shape, which is arranged on the tension element 16 more or less concentrically with respect to the central axis of the tension element 16. A U-shaped section of the disconnectable end stop 6', one side of which forms the stop surface 13", encompasses the bottom part of the tension element 16 and the spring, and limits the compression of the spring i.e. the movement path of the tension element 16 upwards, i.e. in the direction of the even area 13a. The upper end of the tension element 16 is formed in the present case in the form of a hook and is attached in a control bolt 18.

Furthermore, the U-shaped section of the disconnectable end stop 6' forms a channel, wherein on both sides a medium region of the U-shaped section is bent outwards, through which a guiding edge is formed, and projects into a slot passing perpendicular to the even area 13a of the second rail 13. Through this channel, the introduction of force into the rail in the event of striking takes place, i.e. the remaining part of the mechanics is not stressed by the shear force when meeting the stop surfaces 12" and 13".

The mounting of the disconnectable end stop 6' can involve an elastic deformation of the U-shaped section or, alternatively, the side of the second rail 13, so that the guiding edge is clipped into the slot, providing slidability in the longitudinal direction of the slot, and is secured in the slot.

However, alternatively, the slot can also be formed so as to be open downwards, so that the downward movement is delimited by contact with the first rail 12, or optionally by a corresponding arrangement of the tension element 16.

The end of the core of the Bowden cable 8' is attached in the present case to a rotatably mounted lever 17, which is connected to the control bolt 18. Hence a pulling of the Bowden cable 8' causes a rotary movement of the rotatably mounted lever 17, through which the control bolt 18 is also moved, wherein the main component of its moving direction is directed upwards. As a result of the movement of the control bolt 18, the tension element 16, along with the U-shaped section, is lifted against the force of the spring, so that the stop surface 13" is moved upwards and thus the additional shifting area is released.

Hereinbelow, the function of the longitudinal adjuster is discussed in more detail with reference to FIGS. 2a-d, 3a-d and 4a-d.

In normal use by a passenger, the vehicle seat 1 can be moved within the normal use or the comfort adjustment range and be locked again in the desired position by actuating the lever 5 and the release of the locking device 6 related to a lifting of the lever 5, i.e. by lowering a plate 6a with laterally projecting cogs, so that the cogs move downwards and pass out of the stop openings in the first rail 12. The comfort adjustment range is delimited at the back by a meeting of the stop surfaces 12' and 13', which are arranged in the front section of the rails 12 and 13. A relatively far back arranged position of the vehicle seat 1 is shown in FIGS. 2a, 3a and 4a. The (almost) foremost position of the vehicle seat 1 within the comfort adjustment range is shown in FIG. 2b, wherein the stop surfaces 12" and 13" almost bear against each other.

Figure 3D:
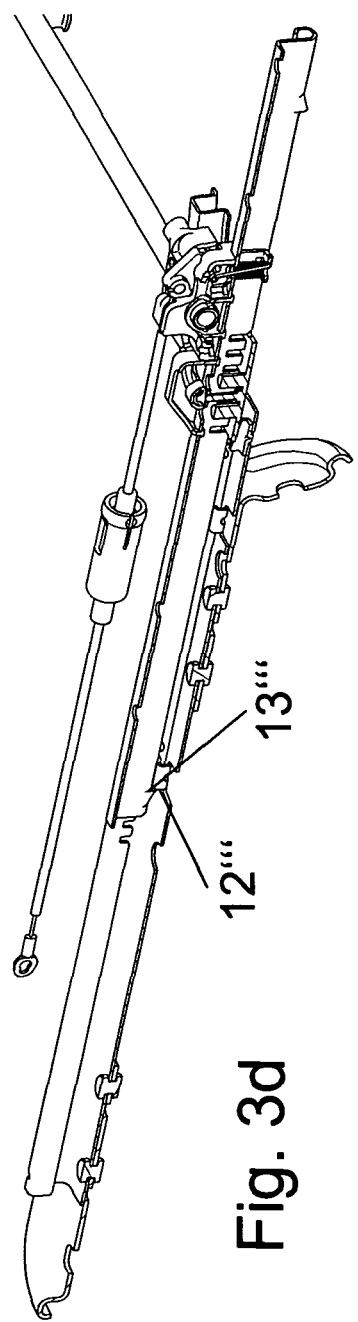

If, proceeding from this position, an actuation of the handle 8 for unlocking the fittings of the backrest 3 and a pivoting forward of the backrest 3 take place, then the Bowden cable 8' is actuated, through which, on the one hand, the locking device 6 is actuated and, by lowering the catching plate, the cogs are moved out of the stop openings and, on the other hand, the disconnectable end stop 6', as it was described above, is lifted, so that the stop surface 13" is lifted and, in the case of a forward movement of the vehicle seat 1, can no longer enter into contact with the stop surface 12", as shown in FIGS. 2c, 3c and 4c, and the vehicle seat 1 can move forward until the stop surfaces 12''' and 13''', which form the front end stop, enter into contact with each other and stop the forward movement of the vehicle seat 1, as shown in FIGS. 2d, 3d and 4d.

Although the locking device 6 has been shown above, for the sake of simplicity, with a single through-plate 6 with laterally projecting cogs, the locking device can be also designed in such a way that several plates are provided, so that, for example—depending on the position—only one of the plates is locking, while the other plates, due to the position, cannot engage.

Alternatively to the above-described disconnectable end stop 6', which can move perpendicular to the even area 13a of the second rail 13, the disconnectable end stop 6' can, in principle, be moved also in another way, for example, can be designed to be pivotable or laterally shiftable, so that in disconnecting the disconnectable end stop 6' the stop surface 13" can avoid the stop surface 12".

FIGS. 8 and 9 show a longitudinal adjuster for a vehicle seat according to a second embodiment example, which has, besides the rail locking device 6 from the first embodiment example, a disconnectable end stop 6' modified with respect to the arrangement of the tension element 16. The disconnectable end stop 6' has here a pin, which serves as tension element 16, with the U-shaped section fixed at its bottom end. According to the first embodiment example, the sides of the U-shaped section are again designed with a protruding area, which is positioned in a slot running in each of the sides of the second rail 13 perpendicular to the even area 13a of the second rail 13 and is mounted in a movable manner. On the pin there is concentrically in turn a spring, which is supported on a step on the pin and with the other end—on the even area 13a. The pin is projected upwards through an opening in the second rail 13 and is connected to U-shaped sheet metal, on which one end of the Bowden cable (not shown) or, alternatively, a lever which is mounted pivotably on said sheet metal and is connected to the Bowden cable, is engaged.

Unlike the first embodiment example, in the second embodiment example, in addition, the stop surface 12" for the disconnectable end stop 6' is arranged not at the end of the rail but further inside.

FIG. 11 shows a longitudinal adjuster for a vehicle seat according to a third embodiment example. The design and functionality of the third embodiment example are largely the same as in the first embodiment example, which is why, essentially, only the differences will be discussed below.

The disconnectable end stop 6' is positioned on the second rail 13 and can be swiveled around a swivel axis. The swivel axis runs here in the transverse direction. However, it is also possible that the swivel axis runs in the travel direction or the vertical direction. Also a different, tilted orientation of the swivel axis is possible.

The movable stop surface 13" is constructed in the travel direction in the front section of the disconnectable end stop 6', while the swivel axis is located in the rear section of the disconnectable end stop 6' in the travel direction.

The tension element 16 is mounted in the front section of the disconnectable end stop 6' in the travel direction, close to the movable stop surface 13". Furthermore, a leaf spring 20 is provided, which pre-stresses the disconnectable end stop 6' downwards in the vertical direction.

On the first rail 12, a rivet stop 22 is provided, riveted here, on which the stop surface 12" is formed.

The Bowden cable 8 is actuated by actuation of the handle 8, whereupon the tension element 16 lifts the front section of the disconnectable end stop 6' in the travel direction and thus swivels the disconnectable end stop 6' around the swivel axis. In this way, the movable stop surface 13" is pulled upwards in the vertical direction as far away as to avoid contact with the stop surface 12".

As soon as the control of the locking device 6 by the Bowden cable 8 is discontinued, the leaf spring 20 swivels back the disconnectable end stop 6' around the swivel axis, wherein the front section of the disconnectable end stop 6' in the travel direction is lowered again along with the movable stop surface 13".

Depending on the construction of the locking device 6, this lowering process can take place in the easy-entry position, i.e. while the disconnectable end stop 6' is located in front of the rivet stop 22 in the travel direction. When the vehicle seat is pushed back within the comfort adjustment range, in this case the disconnectable end stop 6' slides with a slant through the rivet stop 22, and, as a result, similarly as at the lifting by the tension element 16, is swiveled around the swivel axis in such a way that the front section along with the movable stop surface 13" is lifted. After the complete overrun of the rivet stop 22, the leaf spring 20 again swivels back the disconnectable end stop 6'.

In this case, the disconnectable end stop 6' is of single-piece design here as a metal part, wherein the front side of the disconnectable end stop 6' in the travel direction represents the movable stop surface 13".

Alternatively, the disconnectable end stop 6' can also be formed from several parts. For example, it is possible to construct the disconnectable end stop 6' from two parts, wherein the disconnectable end stop 6' comprises one metal part and one plastic part. Preferably, the metal part here forms a base body, whose front side represents the movable stop surface 13" of the disconnectable end stop 6', and on which the leaf spring engages. In this case, the plastic part is fitted on the base body in the front section in the travel direction, wherein the abovementioned slant is formed on the plastic part, and wherein the tension element 16 engages on the plastic part.

According to another embodiment example, which is not shown in the drawing, the rail pairs are arranged as rotated at 90° with respect to the arrangement in the first embodiment example, i.e., for example, the first rail is mounted on a vertically running wall of the vehicle structure, while the second rail is mounted from inside (or optionally also from outside) on the scissor frame (or optionally also on another seat understructure). However, the actual arrangement and function of the disconnectable end stop correspond to that of the first embodiment example and therefore will not be discussed here in more detail.

Although purely mechanically activated locking devices and disconnectable end stops are described above, the activation of a disconnection of the disconnectable end stop can certainly be triggered in another way, for example, electromechanically. Furthermore, for example, the movement of the disconnectable end stop can take place on the basis of non-mechanical forces. For example, an electromagnet can effect the lifting or optionally also the lowering of the disconnectable end stop.

REFERENCE SIGNS LIST

1 Vehicle seat
2 Seat surface
3 Backrest
4 Scissor frame
5 Lever (locking device)
5' Cross bar
6 Locking device
6' Disconnectable end stop
6*a* Plate
8 Handle
8' Bowden cable
8" Excess travel protection device
10 Rail pair
11 Vehicle structure
12 First rail
12', 12", 12''' Stop surface
12*a* Bottom
12*b* Side
12*c* Border area
13 Second rail
13', 13", 13''' Stop surface
13*a* Even area
13*b* Side
13*c* Border area
14 Ball
15 Ball holder
16 Tension element
17 Lever
18 Control bolt
20 Leaf spring
22 Rivet stop

The invention claimed is:

1. A longitudinally adjustable vehicle seat comprising:
   at least one rail pair with a first rail for being fixed to a structure and a second rail connected to the vehicle seat and guided by said first rail;
   a detachable locking device for detachably locking the position of the second rail with respect to the first rail, wherein the detachable locking device can be detached to allow mobility of the second rail with respect to the first rail;
   a first end stop, a second end stop and a third end stop, delimiting the mobility of the second rail with respect to the first rail, wherein the third end stop includes a movable stop surface and the third end stop is configured to be disconnected by moving the movable stop surface out of a traveling path of the first and second rails,
   wherein the first end stop and the third end stop delimit the mobility of the second rail with respect to the first rail to a first adjustment range when the third end stop is not disconnected,
   wherein the first end stop and the second end stop delimit the mobility of the second rail with respect to the first rail to a second adjustment range when the third end stop is disconnected to allow the vehicle seat to be moved to an easy-entry position,
   wherein the movable stop surface is arranged on the second rail, and the third end stop and the locking device are configured to be respectively disconnected and detached together to allow the vehicle seat to be moved to the easy-entry position.

2. The vehicle seat as claimed in claim 1, wherein the third end stop is a front end stop, which delimits the first adjustment range of the traveling path in a forward direction with respect to the first rail, wherein actuating the third end stop extends the traveling path in the forward direction to the second adjustment range by disconnecting and detaching the third end stop.

3. The vehicle seat as claimed in claim 2, wherein a maximum adjustment range forwards and backwards of the second rail with respect to the first rail is limited by the first end stop and the second end stop, wherein the first end stop and the second end stop are fixed on one of the first rail and the second rail, wherein the first adjustment range is a sub-range of the maximum adjustment range.

4. The vehicle seat as claimed in claim 1, wherein the first end stop and the second end stop each have fixed stop surfaces, wherein the first end stop and the second end stop are on the second rail, wherein the movable stop surface of the third end stop is arranged between the two fixed stop surfaces of the first end stop and the second end stop on the second rail.

5. The vehicle seat as claimed in claim 1, wherein fixed stop surfaces of each of the first end stop and the second end stop are arranged on the first rail and fixed to the structure, in such a way that the movable stop surface of the third end stop, is positionable between one end of the first rail and both the first end stop and the second end stop.

6. The vehicle seat as claimed in claim 1, wherein a first fixed stop surface of the first end stop and a second fixed stop surface of the second end stop are arranged on the first rail and fixed to the structure, such that the first fixed stop surface, which delimits the traveling path backwards, is arranged between the movable stop surface and the second fixed stop surface, which delimits the traveling path forwards.

7. The vehicle seat as claimed in claim 1, wherein the locking device is actuatable by two separate actuation devices, wherein actuating a seat length adjustment actuation device only actuates the locking device such that the third end stop remains not disconnected, wherein actuating an end stop actuation device actuates both the locking device and the third end stop, wherein actuating the third end stop retracts the third end stop from the traveling path of the first and second rails.

8. The vehicle seat as claimed in claim 7, wherein the third end stop actuation device has a Bowden cable, with an excess travel protection device.

9. The vehicle seat as claimed in claim 1, wherein the third end stop is positionable within at least one slot formed in the first rail.

10. The vehicle seat as claimed in claim 1, wherein the third end stop is rotatably mounted on the second rail, wherein the third end stop is rotatable about a pivot axis.

11. The vehicle seat as claimed in claim 10, wherein the pivot axis runs in the transverse direction that is perpendicular to the traveling path and the vertical direction.

12. The vehicle seat as claimed in claim 10, wherein the pivot axis is arranged in a rear section of the third end stop with respect to the the traveling path.

13. The vehicle seat as claimed in claim 10, wherein a tension element is mounted in a front section of the third end stop with respect to the traveling path.

14. The vehicle seat as claimed in claim 10, wherein a spring element is provided, which strains the third end stop downwards in the vertical direction.

15. The vehicle seat as claimed in claim 10, wherein the third end stop is constructed from separate parts, including a metal part and a plastic part.

* * * * *